(12) United States Patent
Jha

(10) Patent No.: US 11,502,715 B2
(45) Date of Patent: Nov. 15, 2022

(54) RADIO FREQUENCY (RF) SYSTEM INCLUDING PROGRAMMABLE PROCESSING CIRCUIT PERFORMING BLOCK CODING COMPUTATIONS AND RELATED METHODS

(71) Applicant: Eagle Technology, LLC, Melbourne, FL (US)

(72) Inventor: Uma Shanker Jha, Indian Harbour Beach, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 0 days.

(21) Appl. No.: 16/861,588

(22) Filed: Apr. 29, 2020

(65) Prior Publication Data
US 2021/0344373 A1 Nov. 4, 2021

(51) Int. Cl.
*H04B 1/40* (2015.01)
*G06F 9/30* (2018.01)
*H04L 1/00* (2006.01)

(52) U.S. Cl.
CPC ............ *H04B 1/40* (2013.01); *G06F 9/3004* (2013.01); *H04L 1/0057* (2013.01)

(58) Field of Classification Search
CPC ........ H04B 1/40; G06F 9/3004; H04L 1/0057
See application file for complete search history.

(56) References Cited

U.S. PATENT DOCUMENTS

| | | | | |
|---|---|---|---|---|
| 4,594,687 A | * | 6/1986 | Kaneko | ............... G11C 8/04 |
| | | | | 704/229 |
| 4,839,844 A | | 6/1989 | Watari | |

(Continued)

FOREIGN PATENT DOCUMENTS

| | | | | |
|---|---|---|---|---|
| CN | 107561513 A | * | 1/2018 | ............ H04L 1/066 |
| EP | 1722500 A1 | * | 11/2006 | .......... H04L 1/0668 |

(Continued)

OTHER PUBLICATIONS

J. Lin, H. Yu, Y. Wu and H. Ma, "A Power Efficient Baseband Engine for Multiuser Mobile MIMO-OFDMA Communications," in IEEE Transactions on Circuits and Systems I: Regular Papers, vol. 57, No. 7, pp. 1779-1792, Jul. 2010, doi: 10.1109/TCSI.2009.2034884. (Year: 2020).*

(Continued)

*Primary Examiner* — Berhanu Tadese
(74) *Attorney, Agent, or Firm* — Allen, Dyer, Doppelt + Gilchrist, P.A.

(57) ABSTRACT

A radio frequency (RF) system may include an RF transceiver and a baseband engine, application specific integrated circuit (ASIC) coupled to the RF transceiver and configured to perform a given baseband engine operation from among different baseband engine operations. The baseband engine ASIC may include a memory and a state machine coupled thereto and configured to store a respective set of programming instructions for each of different baseband engine operations and to permit selection of the given set of programming instructions. The baseband engine may also include a programmable processing circuit coupled to the memory and the state machine and configured to perform block coding computations responsive to the given set of programming instructions.

18 Claims, 9 Drawing Sheets

(56) References Cited

U.S. PATENT DOCUMENTS

| | | | |
|---|---|---|---|
| 5,073,820 A | 12/1991 | Nakagawa et al. | |
| 5,126,585 A * | 6/1992 | Boys | H02J 9/062 307/45 |
| 5,357,454 A * | 10/1994 | Dent | G06F 17/145 708/410 |
| 5,394,349 A | 2/1995 | Eddy | |
| 5,539,757 A * | 7/1996 | Cox | H03M 13/3961 714/795 |
| 5,831,977 A * | 11/1998 | Dent | H04B 7/086 375/150 |
| 5,894,473 A * | 4/1999 | Dent | H04J 13/00 370/320 |
| 6,584,154 B1 | 6/2003 | Wu | |
| 6,718,504 B1 * | 4/2004 | Coombs | H03M 13/2957 714/755 |
| 6,754,190 B2 * | 6/2004 | Gurney | H04W 72/02 370/329 |
| 6,970,518 B2 * | 11/2005 | Kuffner | G06K 7/0008 375/259 |
| 6,996,709 B2 * | 2/2006 | Arnold | G06F 9/3001 326/38 |
| 7,023,817 B2 * | 4/2006 | Kuffner | G06K 7/0008 709/227 |
| 7,099,469 B2 * | 8/2006 | Kuhlman | H04L 1/0001 380/37 |
| 7,133,432 B2 * | 11/2006 | Kuffner | H04W 16/14 370/335 |
| 7,218,641 B2 * | 5/2007 | Kuffner | H04L 1/0003 370/465 |
| 7,225,391 B1 * | 5/2007 | Bain | G06F 11/1004 714/752 |
| 7,227,885 B2 * | 6/2007 | Gurney | H04B 1/7093 375/150 |
| 7,239,650 B2 * | 7/2007 | Rakib | H04L 5/026 370/480 |
| 7,295,145 B2 * | 11/2007 | Weber | G01S 7/2813 342/194 |
| 7,305,139 B2 * | 12/2007 | Srinivasan | H04N 19/80 375/E7.193 |
| 7,428,563 B2 * | 9/2008 | Eo | G06F 17/142 708/404 |
| 7,555,512 B2 * | 6/2009 | Chen | G06F 17/142 708/409 |
| 7,555,514 B2 * | 6/2009 | Pedersen | G06F 9/30014 708/409 |
| 7,580,451 B2 * | 8/2009 | Chan | H04L 23/02 375/150 |
| 7,640,284 B1 | 12/2009 | Goodnight et al. | |
| 7,653,029 B2 * | 1/2010 | Molev-Shteiman | H04B 1/707 370/335 |
| 7,706,765 B2 * | 4/2010 | Collins | H04L 12/413 340/572.1 |
| 7,730,378 B2 * | 6/2010 | Li | H03M 13/1125 714/755 |
| 7,836,116 B1 | 11/2010 | Goodnight et al. | |
| 7,870,233 B2 * | 1/2011 | Ralston | H04B 1/40 455/418 |
| 7,932,851 B1 * | 4/2011 | Clark | H04K 1/06 380/255 |
| 8,026,839 B2 * | 9/2011 | Weber | H04B 1/126 342/16 |
| 8,224,883 B2 * | 7/2012 | Pedersen | G06F 17/142 708/700 |
| 8,665,996 B2 * | 3/2014 | Zanotelli | H03M 13/6561 375/340 |
| 8,788,989 B2 | 7/2014 | Eng | |
| 9,008,188 B2 * | 4/2015 | Mueller | H03M 13/1171 375/240.26 |
| 9,048,990 B2 * | 6/2015 | Chiu | H04L 1/0054 |
| 9,081,731 B2 | 7/2015 | Herman et al. | |
| 9,154,274 B2 * | 10/2015 | Walton | H04L 1/0017 |
| 9,158,546 B1 * | 10/2015 | Smith | G06F 12/0811 |
| 9,170,744 B1 * | 10/2015 | Smith | G06F 12/0811 |
| 9,277,418 B1 * | 3/2016 | Farshchian | G01S 7/023 |
| 9,450,612 B2 * | 9/2016 | Hu | H03M 13/611 |
| 9,521,556 B2 * | 12/2016 | Jin | H04W 16/14 |
| 9,942,774 B2 * | 4/2018 | Farshchian | G01S 7/023 |
| 10,069,510 B2 * | 9/2018 | Feygin | H03M 13/13 |
| 10,200,061 B2 * | 2/2019 | Feygin | H01L 22/20 |
| 10,230,495 B2 * | 3/2019 | Nishikawa | H03M 13/157 |
| 10,244,401 B2 * | 3/2019 | Farshchian | H04B 1/06 |
| 10,340,950 B2 * | 7/2019 | Klein | H03M 13/1125 |
| 10,396,862 B1 * | 8/2019 | Ericson | H04B 7/026 |
| 10,495,729 B2 * | 12/2019 | Steinbuch | G01S 7/03 |
| 10,595,209 B2 * | 3/2020 | Farshchian | G01S 7/023 |
| 10,700,829 B2 * | 6/2020 | Garlapati | H04L 1/1845 |
| 10,778,370 B2 * | 9/2020 | Sarkis | H03M 13/13 |
| 10,805,939 B2 * | 10/2020 | John Wilson | H04L 1/0041 |
| 10,963,766 B2 * | 3/2021 | Filonov | G01S 7/38 |
| 11,176,386 B2 * | 11/2021 | Bohacik | H04N 5/23203 |
| 2003/0050945 A1 * | 3/2003 | Chen | G06F 17/142 708/405 |
| 2003/0081669 A1 * | 5/2003 | Yousef | H04L 25/03057 375/233 |
| 2003/0185295 A1 * | 10/2003 | Yousef | H04L 25/03057 375/233 |
| 2004/0047405 A1 * | 3/2004 | Boesel | H04B 1/712 375/E1.032 |
| 2004/0059889 A1 | 3/2004 | Macy et al. | |
| 2004/0078404 A1 | 4/2004 | Macy et al. | |
| 2005/0170034 A1 * | 8/2005 | Ebina | B29C 45/2632 425/406 |
| 2005/0216702 A1 * | 9/2005 | Paolucci | G06F 15/7864 712/35 |
| 2005/0219251 A1 * | 10/2005 | Chun | G06F 9/30181 345/503 |
| 2006/0010188 A1 | 1/2006 | Solomon et al. | |
| 2006/0085497 A1 | 4/2006 | Sehitoglu | |
| 2006/0274708 A1 | 12/2006 | Estraviz et al. | |
| 2007/0168477 A1 * | 7/2007 | Ralston | H04M 3/42178 709/220 |
| 2007/0168908 A1 * | 7/2007 | Paolucci | G06F 9/3885 717/100 |
| 2007/0192396 A1 * | 8/2007 | Pedersen | G06F 7/505 708/505 |
| 2008/0114823 A1 | 5/2008 | Wang et al. | |
| 2008/0144733 A1 * | 6/2008 | ElGamal | H04L 1/0643 375/267 |
| 2009/0034526 A1 * | 2/2009 | Ahmadi | H04L 69/04 370/392 |
| 2009/0040970 A1 * | 2/2009 | Ahmadi | H04B 7/2612 370/329 |
| 2009/0106625 A1 * | 4/2009 | Jun | H04L 1/0057 714/801 |
| 2009/0265410 A1 * | 10/2009 | Pedersen | G06F 9/3885 708/670 |
| 2010/0061431 A1 * | 3/2010 | Jyrkka | H04L 12/66 375/220 |
| 2010/0293356 A1 * | 11/2010 | Plunkett | G06F 15/177 712/15 |
| 2011/0026601 A1 * | 2/2011 | Mueller | H03M 13/395 375/240.24 |
| 2011/0243066 A1 * | 10/2011 | Nayeb Nazar | H04L 5/0016 370/328 |
| 2013/0143605 A1 * | 6/2013 | Chiu | H04L 1/0054 455/458 |
| 2013/0148694 A1 | 6/2013 | Hoffman et al. | |
| 2013/0173203 A1 | 7/2013 | Palaskas et al. | |
| 2015/0121060 A1 * | 4/2015 | Mimms | G06F 8/65 713/100 |
| 2015/0124912 A1 * | 5/2015 | Eliaz | H04L 25/03286 375/343 |
| 2016/0020844 A1 * | 1/2016 | Hart | H04B 7/0617 370/280 |
| 2016/0088641 A1 * | 3/2016 | Kwon | H04L 1/00 370/329 |
| 2016/0277083 A1 * | 9/2016 | Koike-Akino | H04B 7/0615 |
| 2017/0103042 A1 | 4/2017 | Mundhada et al. | |
| 2017/0147314 A1 * | 5/2017 | Choi | H04W 48/18 |

(56) References Cited

U.S. PATENT DOCUMENTS

| | | | |
|---|---|---|---|
| 2018/0013868 A1* | 1/2018 | Lin | H03M 13/2906 |
| 2018/0109269 A1* | 4/2018 | Richardson | H03M 13/3911 |
| 2018/0367239 A1* | 12/2018 | Jang | H04L 1/0013 |
| 2018/0375612 A1* | 12/2018 | Sarkis | H04L 1/0041 |
| 2019/0058490 A1* | 2/2019 | Klein | H03M 13/1125 |
| 2019/0173619 A1* | 6/2019 | Li | H04L 1/1887 |
| 2019/0223184 A1* | 7/2019 | Sarkis | H04W 72/0413 |
| 2019/0253213 A1* | 8/2019 | Garlapati | H04L 1/0045 |
| 2019/0312676 A1* | 10/2019 | Jeong | H03M 13/6356 |
| 2019/0372605 A1* | 12/2019 | Li | H04L 1/0057 |
| 2020/0259505 A1* | 8/2020 | Xu | H04L 1/0068 |
| 2020/0271775 A1* | 8/2020 | Speed | G01S 7/034 |
| 2020/0305223 A1* | 9/2020 | Muthukrishnan | H04W 4/029 |
| 2020/0326419 A1* | 10/2020 | Parsche | H04L 27/2082 |
| 2020/0348412 A1* | 11/2020 | Durham | H01Q 21/28 |
| 2020/0366430 A1* | 11/2020 | Yu | H04L 5/0048 |
| 2020/0374034 A1* | 11/2020 | Xu | H04L 1/0013 |
| 2021/0029718 A1* | 1/2021 | John Wilson | H04W 72/085 |
| 2021/0344372 A1* | 11/2021 | Jha | H04B 1/40 |
| 2021/0344373 A1* | 11/2021 | Jha | H04L 1/0054 |

FOREIGN PATENT DOCUMENTS

| | | | | |
|---|---|---|---|---|
| EP | 1722501 A1 | * | 11/2006 | H04L 1/0668 |
| EP | 3905035 A1 | * | 11/2021 | G06F 17/142 |
| KR | 2014133690 A | * | 11/2014 | H04L 1/06 |
| WO | 01053932 | | 7/2001 | |

OTHER PUBLICATIONS

Uma Shanker Jha, U.S. Appl. No. 16/861,563, filed Apr. 29, 2020.

Wang et al., "An application specific instruction set processor optimized for FFT", IEEE, 2011, pp. 1-4.

Teymourzadeh et al., "Characteristic analysis of 1024-point quantized radix-2 FFT-IFFT processor", IEEE, 2012, pp. 664-668.

Kumar et al., "Performance evaluation of modified OFDM for underwater communications", 2013 IEEE International Conference on Communications Workshops (ICC), 2013, pp. 967-971.

* cited by examiner

RADIO FREQUENCY (RF) SYSTEM INCLUDING PROGRAMMABLE PROCESSING CIRCUIT PERFORMING BLOCK CODING COMPUTATIONS AND RELATED METHODS

TECHNICAL FIELD

The present invention relates to the field of electronics, and more particularly, to radio frequency (RF) systems and related methods.

BACKGROUND

A typical radio frequency (RF) system may perform a single RF function. For example, to perform multiple RF functions, several individual devices, systems, or circuits that each perform a single RF function may be used. These individual devices, systems, or circuits generally are implemented using a field programmable gate array (FPGA), which may be relatively expensive, have a relatively high power demand, and may have a lagging node geometry.

U.S. Pat. No. 7,870,233 to Ralston et al. discloses a software download configurable communication device. The device includes an architecture format referred to as reconfigurable logic. Reconfigurable logic refers to a real-time operating system (RTOS) where the outside source controls the type of state machines that control the dataflow process (i.e. control flow process). With reconfigurable logic, stored-instruction engines rely on shared buses for the transfer of data and instructions. Stored program instructions are used to run on an instruction decoder and controller. In another architecture, a hardware kernel plane provides the capability of reconfigurability for a range of protocols in an application, or within a range of applications. Additionally, the hardware kernel plane is modular, and thus may be designed to operate in groups.

U.S. Pat. No. 8,788,989 to Eng is directed to a system for developing an application specific integrated circuit (ASIC). A hardware description, for example, a second hardware description, may be generated and may include modification of a first hardware description to optimize the ASIC. The ASIC may be created or configured and may implement the function of a software program. Configuring or creating the ASIC may include implementing the second hardware description (or the final hardware configuration/plurality of second hardware configurations) on the ASIC. For example, where the hardware description for configuring the ASIC includes a state machine, configuring the ASIC may include implementing the state machine. Furthermore, configuring the ASIC may include implementing one or more portions of the first hardware description on the ASIC.

SUMMARY

A radio frequency (RF) system may include an RF transceiver and a baseband engine, application specific integrated circuit (ASIC) coupled to the RF transceiver and configured to perform a given baseband engine operation from among a plurality of different baseband engine operations. The baseband engine ASIC may include a memory and a state machine coupled thereto and configured to store a respective set of programming instructions for each of the plurality of different baseband engine operations and to permit selection of the given set of programming instructions. The baseband engine ASIC may also include a programmable processing circuit coupled to the memory and the state machine and configured to perform a plurality of block coding computations responsive to the given set of programming instructions.

The programmable processing circuit may be configured to operate an application programming interface (API) to permit selection of the given set of programming instructions, for example. The plurality of block coding computations may include a plurality of cyclic code computations.

The plurality of block coding computations may include a plurality of n-bit cyclic redundancy check (CRC) computations. N may be between 8 and 32, for example.

The RF system may include a channelization circuit between the RF transceiver and the baseband engine ASIC, for example. The RF system may include a sample rate conversion circuit between the RF transceiver and the baseband engine ASIC.

The RF system may include an analog-to-digital converter (ADC) coupled between the RF transceiver and the baseband engine ASIC, for example. The RF system may include a digital-to-analog converter (DAC) coupled between the RF transceiver and the baseband engine ASIC.

A method aspect is directed to a method of performing a given baseband engine operation from among a plurality of different baseband engine operations. The method may include operating a memory and state machine of a baseband engine, application specific integrated circuit (ASIC) to permit selection of the given set of programming instructions from among respective sets of programming instructions stored in the memory for each of a plurality of different baseband engine operations. The method may also include operating a programmable processing circuit of the baseband engine ASIC to perform a plurality of block coding computations responsive to the given set of programming instructions.

DETAILED DESCRIPTION

Figure 1:
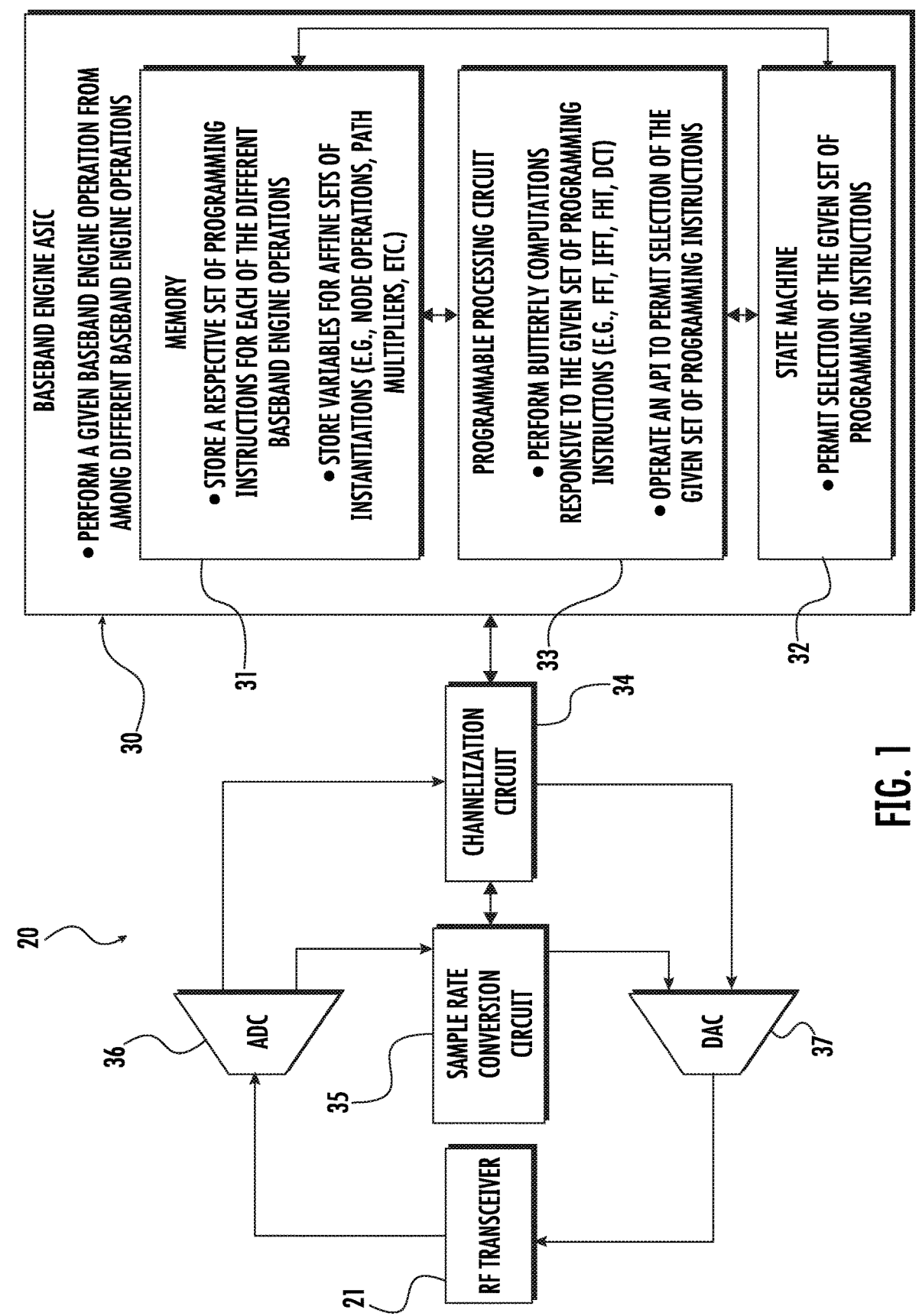
FIG. 1 is a schematic block diagram of an RF system according to an embodiment.

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-5, a radio frequency (RF) system 20 includes an RF transceiver 21. The RF transceiver 21 may be for use in a radar system, communications system, or other RF system. In other words, the RF transceiver 21 may be operable across a range of desired frequencies. The RF system 20 also includes a baseband engine, application specific integrated circuit (ASIC) 30. The baseband engine ASIC 30 is coupled to the RF transceiver 21 and performs a given baseband engine operation from among different baseband engine operations.

The baseband engine ASIC 30 includes a memory 31 and a state machine 32 coupled to the memory. A programmable processing circuit 33 is also coupled to the memory 31 and the state machine 32.

A respective set of programming instructions are stored in the memory 31 for each of the different baseband engine operations. For example, the different operations may include radar operations (e.g., multi-function array) and communications operations. The baseband engine ASIC 30 also permits selection of the given set of the programming instructions. More particularly, the programmable processing circuit 33 may operate an application programming interface (API) to permit selection of the given set of programming instructions. For example, a user may operate software via a display and an input device to select the given set of programming instructions. Variables may also be stored in the memory 31, for example, for affine sets of instantiations (e.g., node operations, path multipliers, etc.). The variable may be included with or part of the given set of programming instructions.

The programmable processing circuit 33 also performs butterfly computations responsive to the given set of programming instructions. As will be understood by those skilled in the art, in the context of fast Fourier transform (FFT) algorithms, butterfly computations are the portion of the FFT computation that combines the results of smaller discrete Fourier transforms (DFTs) into a larger DFT, or vice versa (breaking a larger DFT up into sub-transforms). The name "butterfly" comes from the shape of the data-flow diagram, for example, in the radix-2 case.

Figure 2:
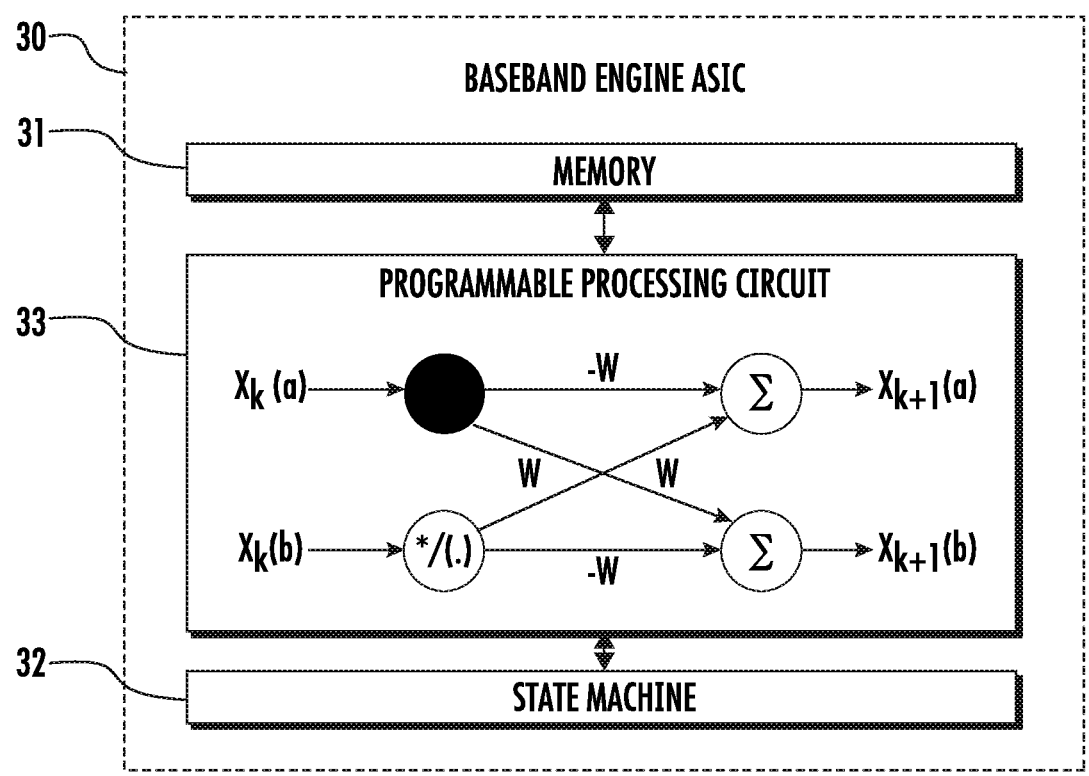
FIG. 2 is a schematic block diagram of the baseband engine ASIC of the RF system of FIG. 1.
Figure 3:
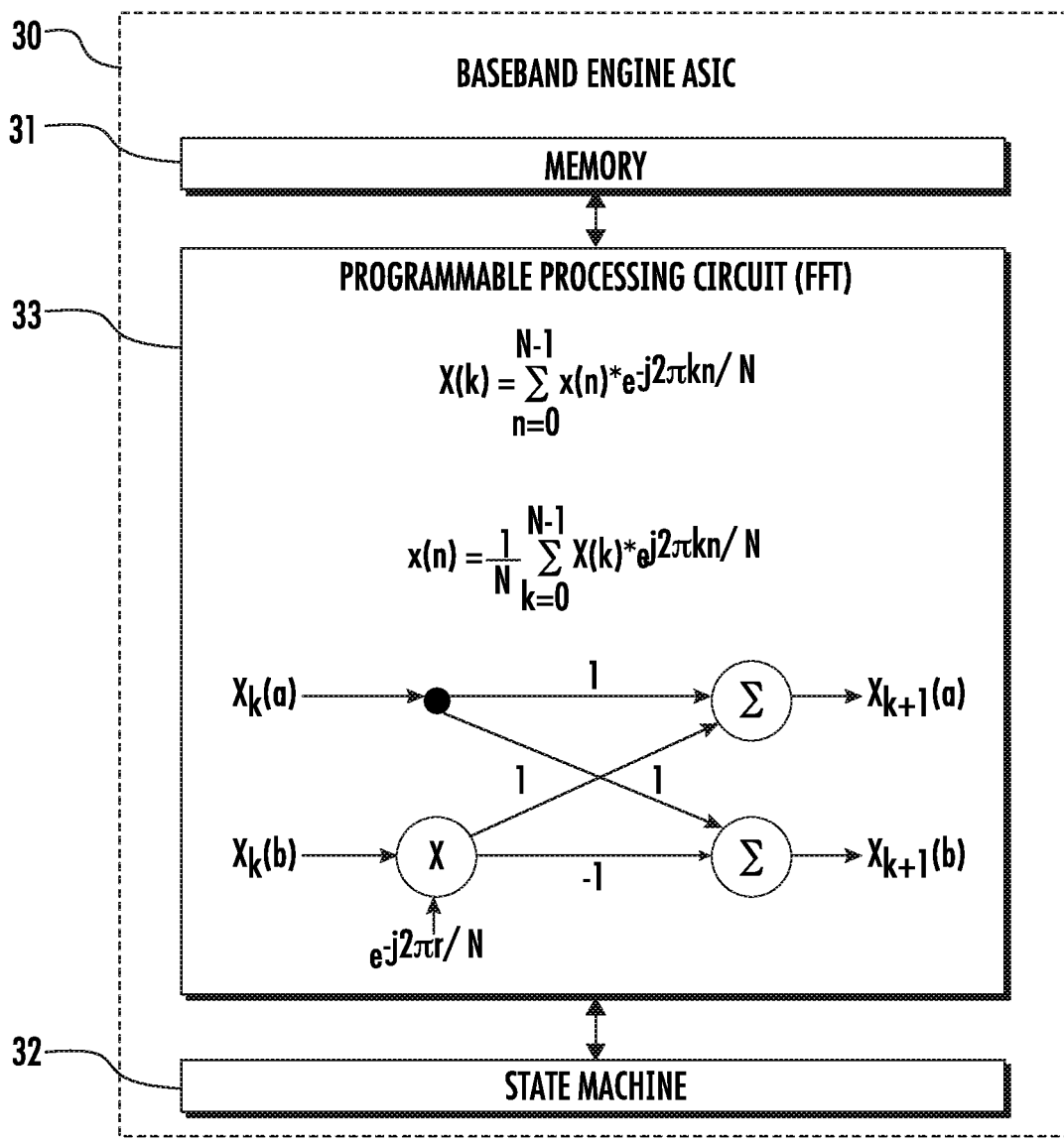
FIG. 3 is a schematic block diagram of the baseband engine ASIC of the RF system of FIG. 1 for performing FFT computations.

For example, branch weights may be provided as inputs to a butterfly structure while control is provided by node functionalities, as will be appreciated by those skilled in the art. An exemplary butterfly structure is illustrated in FIG. 2, whereby the $X_k$ are branch $k_{th}$ inputs, W represents a coefficient or weight, and $X_{k+1}$ are outputs. The butterfly computations may include fast-Fourier transform (FFT) computations (FIG. 3). In particular, a multidimensional DFT transforms an array x(n) with a d-dimensional vector of indices $n=(n_1, \ldots, n_d)$ by a set of d nested summations (over $n_j=0 \ldots N_{j-1}$) for each j, where the division n/N, is performed element-wise (FIG. 3). Equivalently, it is the composition of a sequence of d sets of one-dimensional DFTs, performed along one dimension at a time (in any order).

In other embodiments, the butterfly computations may also include inverse fast-Fourier transform computations (IFFT) as will be appreciated by those skilled in the art.

Figure 4:
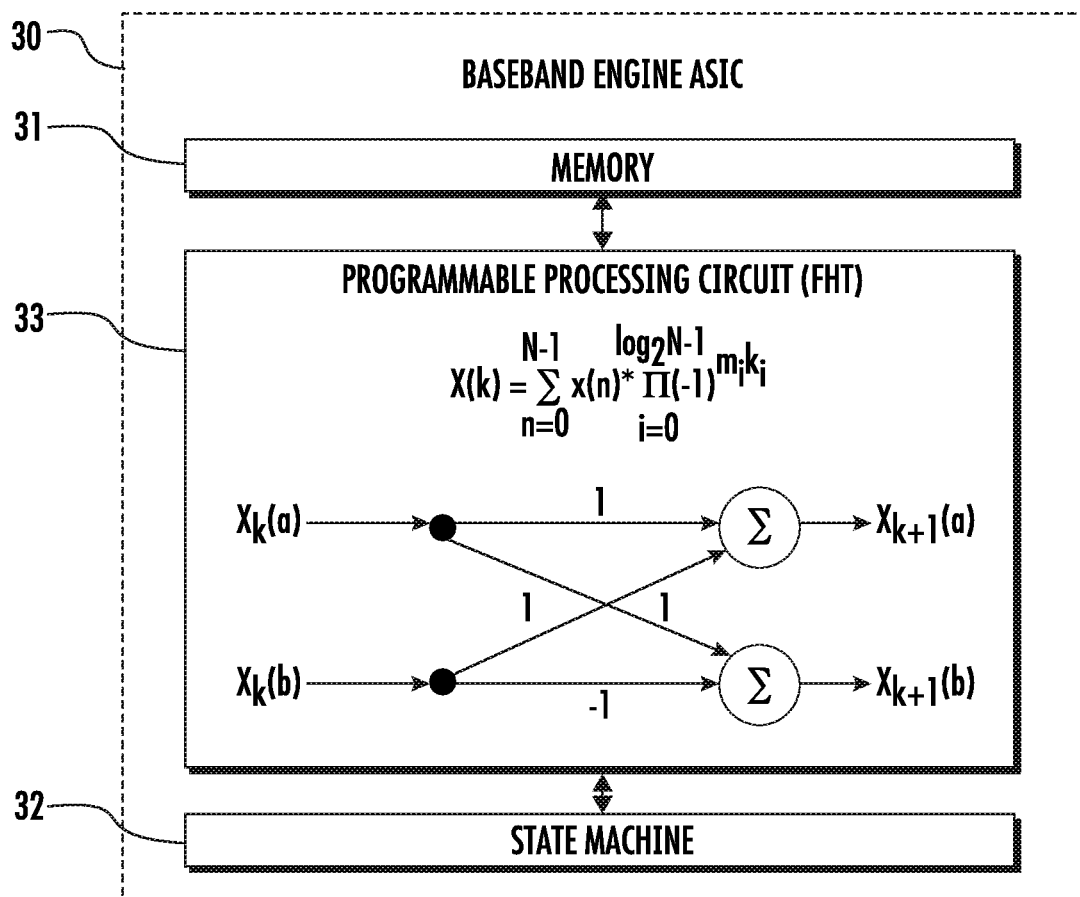
FIG. 4 is a schematic block diagram of the baseband engine ASIC of the RF system of FIG. 1 for performing FHT computations.

The butterfly computations may also include fast-Hadamard transform (FHT) computations (FIG. 4). Those skilled in the art will recognize that an FHT is a Walsh-Hadamard transform of discrete, periodic data similar to the DFT.

Figure 5:
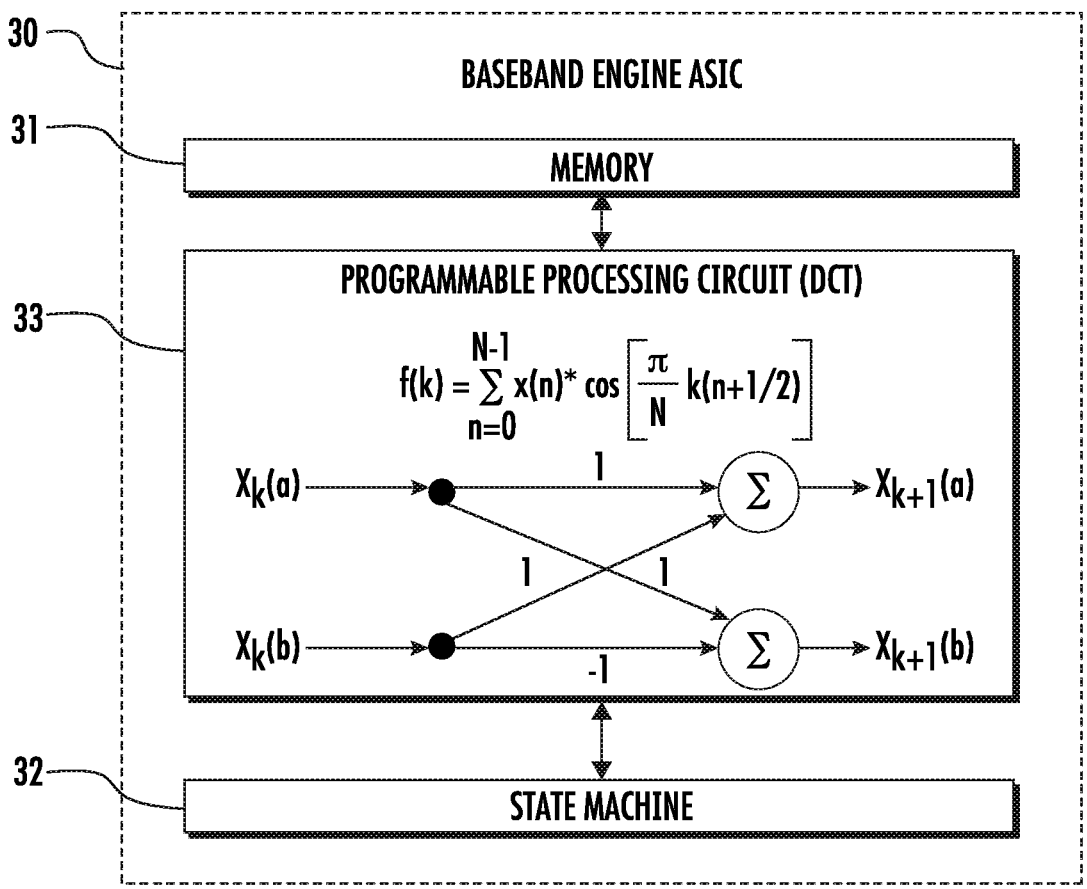
FIG. 5 is a schematic block diagram of the baseband engine ASIC of the RF system of FIG. 1 for performing DCT computations.

The butterfly computations may also include discrete cosine transform (DCT) computations (FIG. 5). A DCT expresses a finite sequence of data points in terms of a sum of cosine functions oscillating at different frequencies (FIG. 5).

Figure 6:
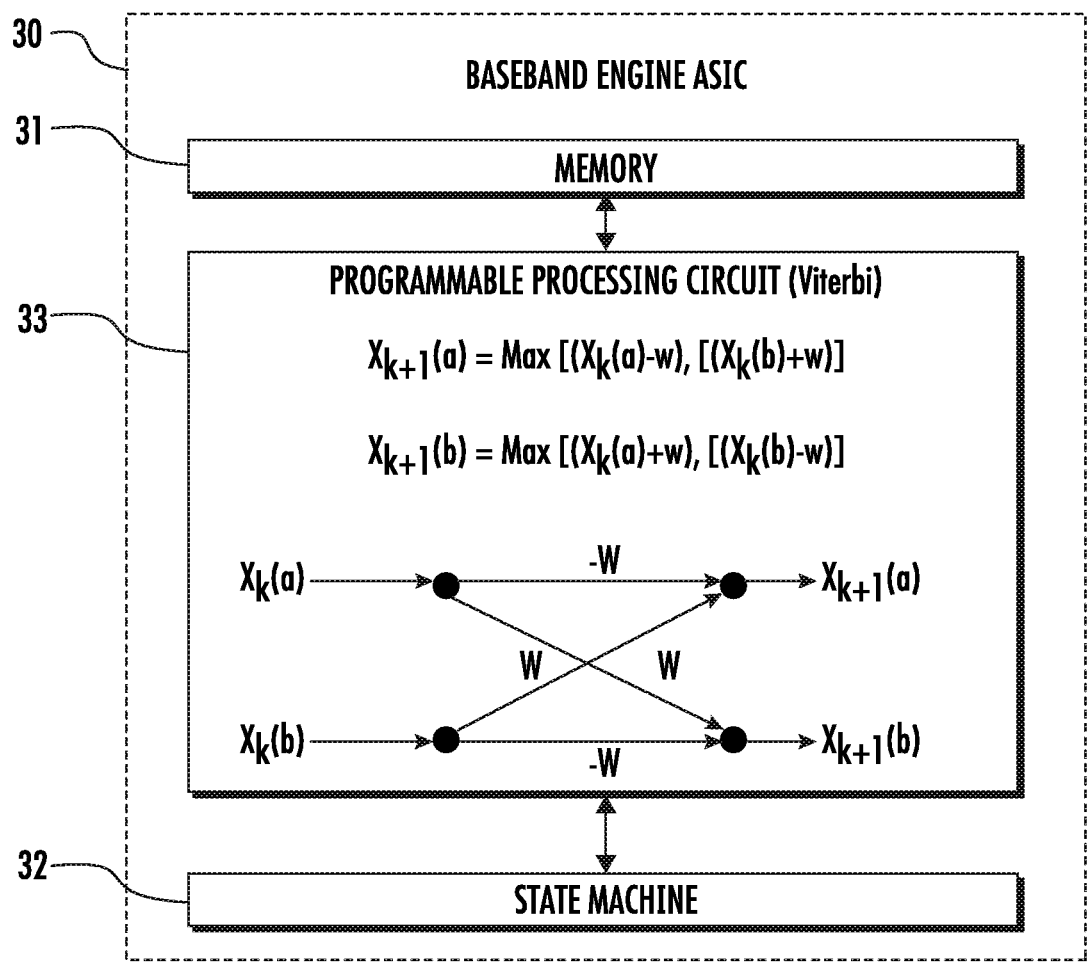
FIG. 6 is a schematic block diagram of the baseband engine ASIC of the RF system of FIG. 1 for performing Viterbi computations.
Figure 7:
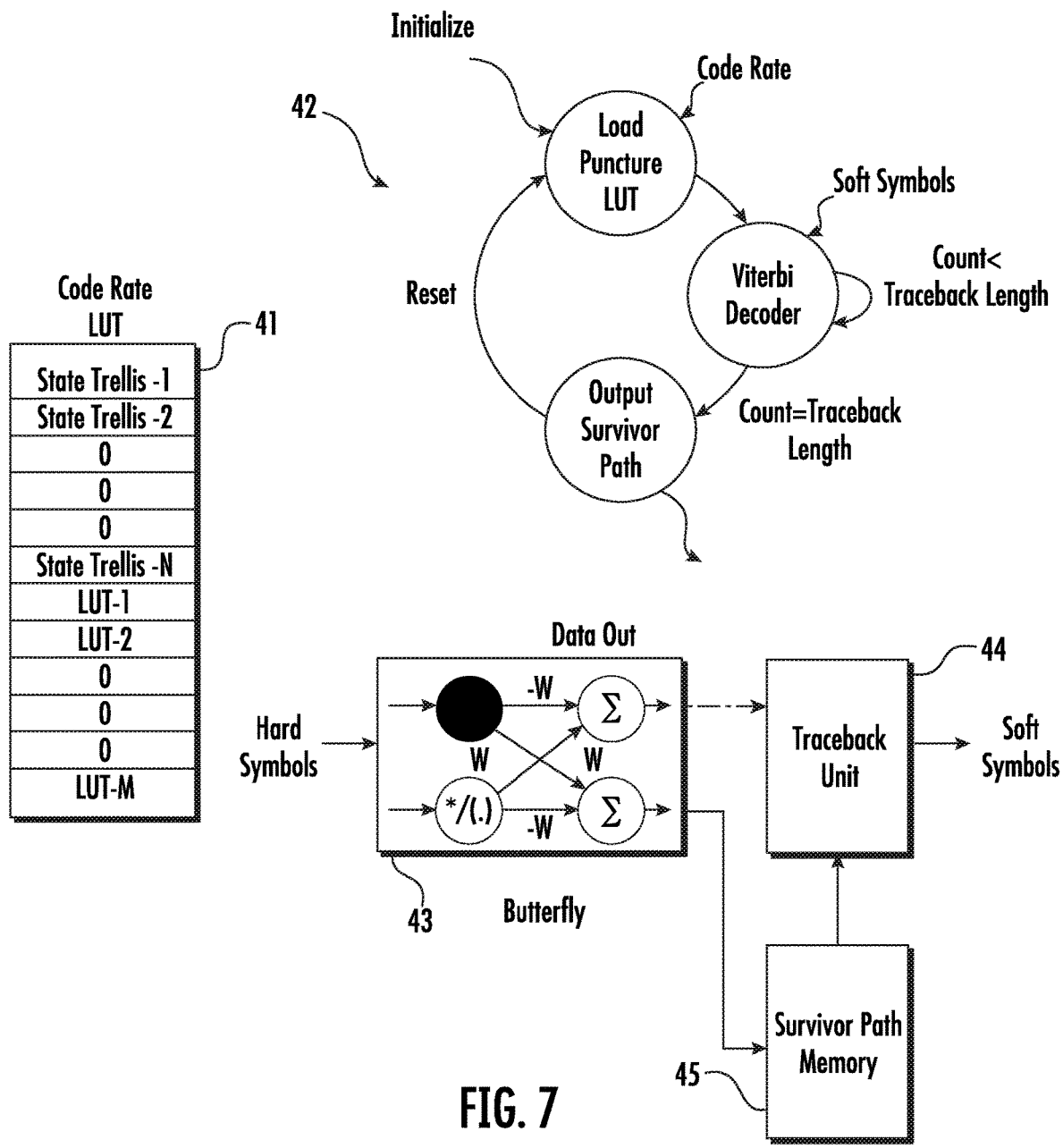
FIG. 7 is a schematic diagram of an RF system performing Viterbi decoding computations in accordance with an exemplary embodiment.

Referring now additionally to FIGS. 6 and 7 the butterfly computations may also include Viterbi decoding computations. A Viterbi decoder, for example, uses the Viterbi algorithm for decoding a bitstream that has been encoded using a convolutional code or trellis code. The Viterbi algorithm is a dynamic programming algorithm for finding the most likely sequence of hidden states—called the Viterbi path—that results in a sequence of observed events, especially in the context of Markov information sources and hidden Markov models (HMM) (FIG. 6).

As shown in FIG. 7, an exemplary RF system includes programmable processing circuitry for performing Viterbi decoding computations, and includes a code rate look up table 41 used with or provided to an associated state machine 42. Hard symbols may be provided to a butterfly structure 43, the output of which may be provided to a traceback unit 44 and a survivor path memory 45. The survivor path memory 45 provides input to the traceback unit 44, which in turn provides soft symbols as an output.

Referring again to FIG. 1, a channelization circuit 34 and a sample rate conversion circuit 35 are coupled between the RF transceiver 21 and the baseband engine ASIC 30. An analog-to-digital converter (ADC) 36 and digital-to-analog converter (DAC) 37 are also coupled between the RF transceiver 21 and the baseband engine ASIC 30. More particularly, the DAC 37 is coupled between the channelization circuit 34 or the sample rate conversion circuit 35 and the RF transceiver 21, and provides input to the RF transceiver. The ADC 36 is also coupled between the channelization circuit 34 or the sample rate conversion circuit 35 and the RF transceiver 21, and provides accepts output from the RF transceiver.

A method aspect is directed to a method of performing a given baseband engine operation from among a plurality of different baseband engine operations. The method may include operating a memory 31 and state machine 32 of a baseband engine ASIC 30 to permit selection of the given set of programming instructions from among respective sets of programming instructions stored in the memory for each of a plurality of different baseband engine operations. The method may further include operating a programmable processing circuit 33 of the baseband engine ASIC 30 to perform a plurality of butterfly computations responsive to the given set of programming instructions.

The method may also include operating an application programming interface (API) using the programmable processing circuit 33 to permit selection of the given set of programming instructions. The plurality of butterfly computations may comprise a plurality of fast-Fourier transform (FFT) computations, a plurality of inverse fast-Fourier transform (IFFT) computations, a plurality of fast-Hadamard transform (FHT) computations, a plurality of Viterbi decoding computations, or a plurality of discrete cosine transform (DCT) computations.

The method may also include operating a channelization circuit 34 between a radio frequency (RF) transceiver 21 and the baseband engine ASIC 30, and operating a sample rate conversion circuit 35 between RF transceiver and the baseband engine ASIC.

Figure 8:
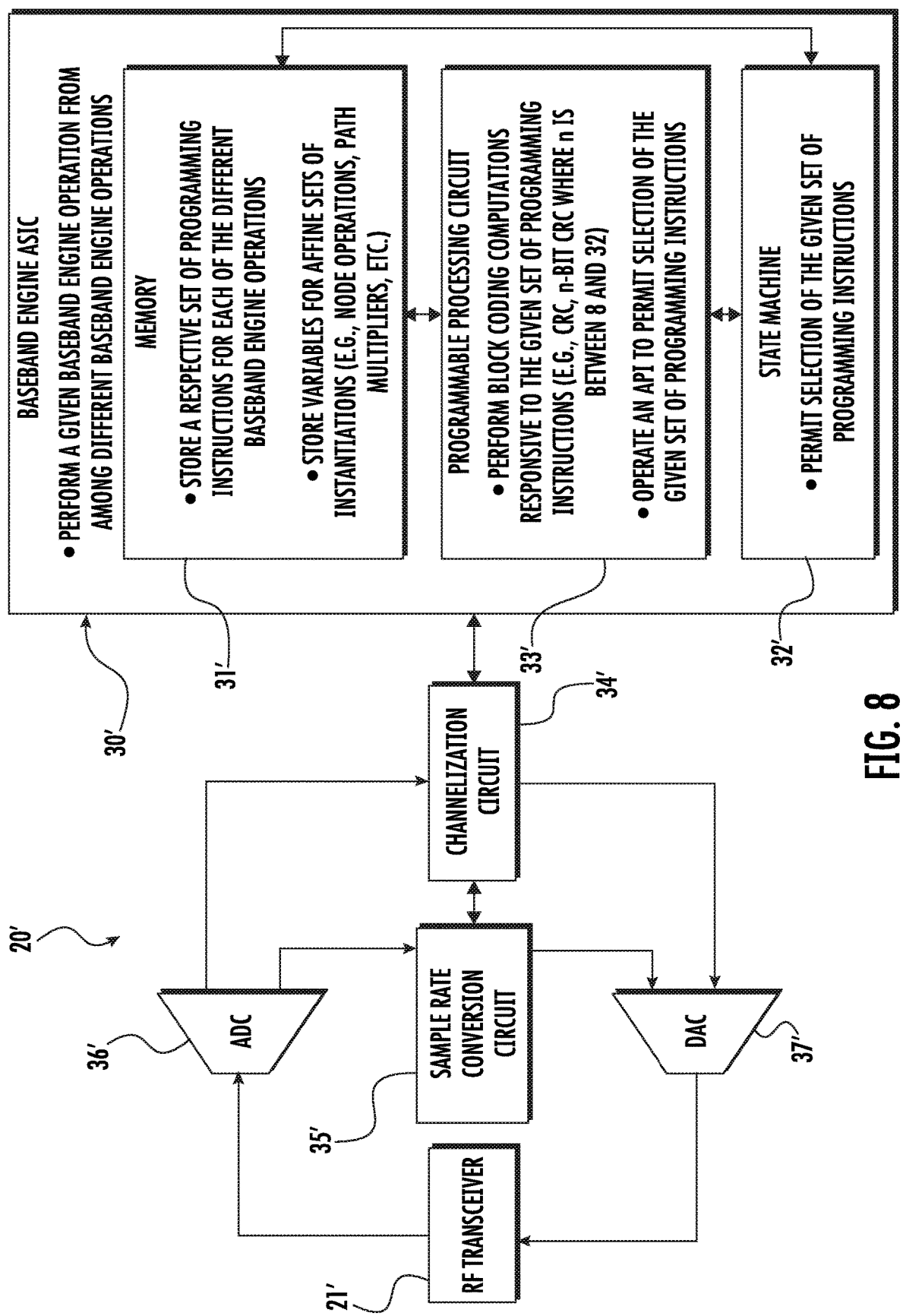
FIG. 8 is a schematic block diagram of an RF system according to another embodiment.
Figure 9:
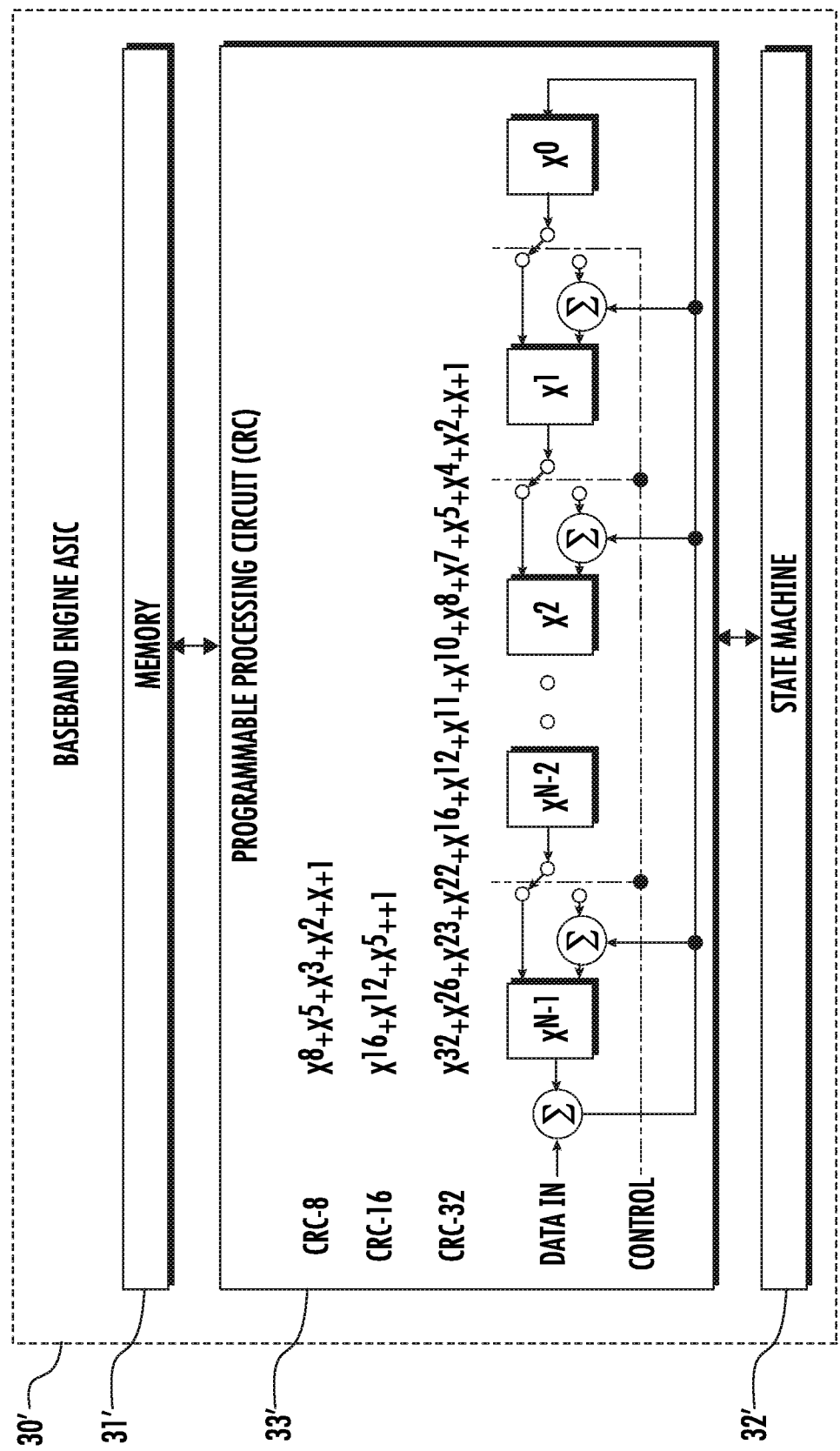
FIG. 9 is a schematic block diagram of the baseband engine ASIC of the RF system of FIG. 8 for performing CRC computations.

Referring now to FIGS. 8-9, in another embodiment, the programmable processing circuit 33' may perform, for example, instead of butterfly computations, block coding computations responsive to the given set of programming instructions. Those skilled in the art will appreciate that block codes are a large and important family of error-correcting codes that encode data in blocks.

The block coding computations may include cyclic code computations. A cyclic code is a block code, where the circular shifts of each codeword gives another word that belongs to the code. A cyclic code is an error-correcting code that has algebraic properties that are convenient for efficient error detection and correction. Accordingly, the cyclic code computations may include n-bit cyclic redundancy check (CRC) computations, whereby n may be between 8 and 32, for example. Of course, n may be another number outside this range. A CRC code is an error-detecting code commonly used in digital networks and storage devices to detect accidental changes to raw data. Blocks of data entering these systems get a short checksum value attached, based on the remainder of a polynomial division of their contents. On retrieval, the calculation is repeated and, in the event the checksum values do not match, corrective action can be taken against data corruption. An architecture for generating a CRC may include an input that receives a polynomial (i.e., n-bit polynomial) and is controlled by way of exclusive OR-ing of bits form the generating polynomial (FIG. 9).

While the programmable processing circuit 33' performs block coding computations, for example, instead of butterfly computations, those skilled in the art will recognize that the programmable processing circuit of the baseband engine ASIC 30' may perform either butterfly or block coding computations depending on the selected set of programming instructions. Elements illustrated but not specifically described are similar to those described above with respect to FIG. 1.

As will be appreciated by those skilled in the art, by being programmable or reprogrammable for different operations the RF system 20, 20' may provide increased RF functionality within a smaller space, using less power, and with a reduced amount of weight. In contrast, conventional RF systems may have discrete circuitry or individual devices for each function, and reusing or reprogramming these individual devices or circuits may not be possible, or, in some cases where reprogramming may be possible, reuse or reprogramming may be relatively costly and/or complex for implementation. In other words, these relatively complex RF systems with individual or discrete device for each function are generally not scalable nor flexible to allow for upgrade or feature addition.

A method aspect is directed to a method of performing a given baseband engine operation from among a plurality of different baseband engine operations. The method may include operating a memory 31' and state machine 32' of a baseband engine, application specific integrated circuit (ASIC) 30' to permit selection of the given set of programming instructions from among respective sets of programming instructions stored in the memory for each of a plurality of different baseband engine operations. The method may also include operating a programmable processing circuit 33' of the baseband engine ASIC 30' to perform a plurality of block coding computations responsive to the given set of programming instructions.

The method may also include operating an application programming interface (API) using the programmable processing circuit 33' to permit selection of the given set of programming instructions. For example, the plurality of block coding computations may comprise a plurality of cyclic code computations, such as n-bit cyclic redundancy check (CRC) computations, wherein n is between 8 and 32. Of course, n may be another number, for example, an arbitrary number.

The method may also include operating a channelization circuit 34' between a radio frequency (RF) transceiver 21' and the baseband engine ASIC 30', and operating a sample rate conversion circuit 35' between the RF transceiver and the baseband engine ASIC.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) system comprising: an input device; an RF transceiver; and a baseband engine application specific integrated circuit (ASIC) coupled to the RF transceiver and configured to perform a given baseband engine operation from among a plurality of different baseband engine operations comprising at least a radar operation and a communication operation, the baseband engine ASIC comprising a memory and a state machine coupled thereto and configured to store a respective set of programming instructions for each of the plurality of different baseband engine operations, each respective set of programming instructions comprising variables for sets of instantiations associated with the different baseband engine operations, and permit selection of the given set of programming instructions, and a programmable processing circuit coupled to said memory and said state machine and configured to perform a plurality of block coding computations responsive to the given set of programming instructions, and operate an application programming interface (API) to permit selection via said input device, of the given set of programming instructions.

2. The RF system of claim 1 wherein the plurality of block coding computations comprises a plurality of cyclic code computations.

3. The RF system of claim 1, wherein the plurality of block coding computations further comprises a plurality of n-bit cyclic redundancy check (CRC) computations.

4. The RF system of claim 3 wherein n is between 8 and 32.

5. The RF system of claim 1 further comprising a channelization circuit between said RF transceiver and said baseband engine ASIC.

6. The RF system of claim 1 comprising a sample rate conversion circuit between said RF transceiver and said baseband engine ASIC.

7. The RF system of claim 1 further comprising an analog-to-digital converter (ADC) between said RF transceiver and said baseband engine ASIC.

8. The RF system of claim 1 further comprising a digital-to-analog converter (DAC) between said RF transceiver and said baseband engine ASIC.

9. A baseband engine application specific integrated circuit (ASIC) to couple to a radio frequency (RF) transceiver and configured to perform a given baseband engine operation from among a plurality of different baseband engine operations comprising at least a radar operation and a communication operation, the baseband engine ASIC comprising: a memory and a state machine coupled thereto and configured to store a respective set of programming instructions for each of the plurality of different baseband engine operations, each respective set of programming instructions comprising variables for sets of instantiations associated with the different baseband engine operations, and permit selection of the given set of programming instructions; and a programmable processing circuit coupled to said memory and said state machine and configured to perform a plurality of block coding computations responsive to the given set of programming instructions, and operate an application programming interface (API) to permit selection via an input device, of the given set of programming instructions.

10. The baseband engine ASIC of claim 9 wherein the plurality of block coding computations comprises a plurality of cyclic code computations.

11. The baseband engine ASIC of claim 9 wherein the plurality of block coding computations comprises a plurality of n-bit cyclic redundancy check (CRC) computations.

12. The baseband engine ASIC of claim 11 wherein n is between 8 and 32.

13. A method of performing a given baseband engine operation from among a plurality of different baseband engine operations comprising at least a radar operation and a communication operation, the method comprising: operating a memory and state machine of a baseband engine application specific integrated circuit (ASIC) to permit selection of the given set of programming instructions from among respective sets of programming instructions stored in the memory for each of a plurality of different baseband engine operations, each respective set of programming instructions comprising variables for sets of instantiations associated with the different baseband engine operations; and operating a programmable processing circuit of the baseband engine ASIC to perform a plurality of block coding computations responsive to the given set of programming instructions; and operating an application programming interface (API) to permit, via an input device, selection of the given set of programming instructions.

14. The method of claim 13 wherein the plurality of block coding computations comprises a plurality of cyclic code computations.

15. The method of claim 13 wherein the plurality of block coding computations further comprises a plurality of n-bit cyclic redundancy check (CRC) computations.

16. The method of claim 15 wherein n is between 8 and 32.

17. The method of claim 13 further comprising operating a channelization circuit between a radio frequency (RF) transceiver and the baseband engine ASIC.

18. The method of claim 13 further comprising operating a sample rate conversion circuit between a radio frequency (RF) transceiver and the baseband engine ASIC.

\* \* \* \* \*